Aug. 23, 1949.                A. CALISE                2,479,811
                         CONDIMENT DISPENSER
                         Filed July 19, 1946

INVENTOR.
ART CALISE,
BY
ATTORNEYS

Patented Aug. 23, 1949

2,479,811

UNITED STATES PATENT OFFICE 2,479,811

CONDIMENT DISPENSER

Art Calise, Chicago, Ill.

Application July 19, 1946, Serial No. 685,007

2 Claims. (Cl. 65—57)

This instant invention relates to improvements in shakers for salt, pepper or spice.

The main object of the invention is to provide a dispensing lid cooperating with a cap of a condiment container and including a plurality of pins for opening or closing dispensing holes in the cap and wiping the edges of the holes clear of condiment adhering thereto.

Another object is to provide a cap characterized and of simple, enduring and inexpensive construction.

With these and other objects in view, which will become apparent as the invention is fully understood, the same resides in the novelty of construction, combination and arrangement of elements hereinafter specifically described and claimed in the appended claims.

The description should be read in connection with the accompanying drawing illustrating the preferred embodiment of my invention and wherein.

Figure 1:
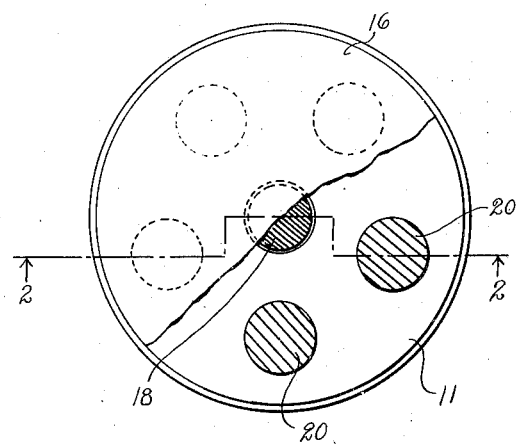
Figure 1 is a top plan view of the lid partly broken away.
Figure 2:
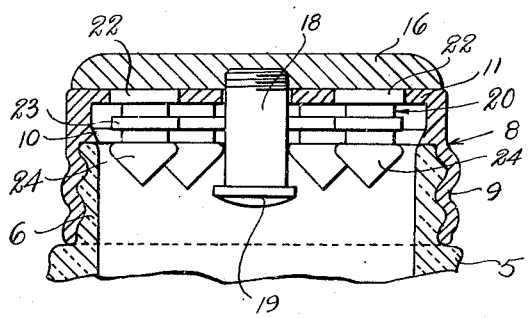
Figure 2 is a diametral section of the lid in position closing the holes in the cap of the container.

In the drawing, wherein like characters of reference designate like or similar parts throughout the several views, numeral 5 denotes a conventional container of glass or any other suitable material and including an exteriorly threaded neck 6 the outer open end of which may be kept closed by a cap 8. The same has a threaded substantially cylindrical part 9 having at its inner end an inwardly extending radial flange 10 and a circular cover or end portion 11 axially spaced from the flange. When the closure closes the open end of the neck, the flange 10 overlies the end of the latter (Fig. 2, 3).

The cover portion is provided with a central opening 13 and a plurality of openings 14 equidistantly spaced from the former and from one another.

The substantially circular dispensing lid 16 may be made of any material, preferably from aluminum or plastic has a flat side to contact the outer side of the flat end 11 and a slightly convex outer side and a diameter slightly shorter than that of the cap. Into the center of the flat side of the lid is screwed the outer threaded end of a bolt 18 having a head 19 somewhat larger than the central opening 13 in which the shank of the bolt is freely slidable. The bolt 18 therefore permits the displacement of the lid from the cap but prevents the separation of one from the other.

From the flat side of the lid extend also pins or plungers 20 equal in number to the number of openings 14 and each registering with one of them. Each pin comprises a plug portion 22 formed adjacent the flat side of the lid, a scraper portion 23 spaced therefrom and a conical end 24, all of these parts being of larger diameter than the shank of the pin.

Figure 3:
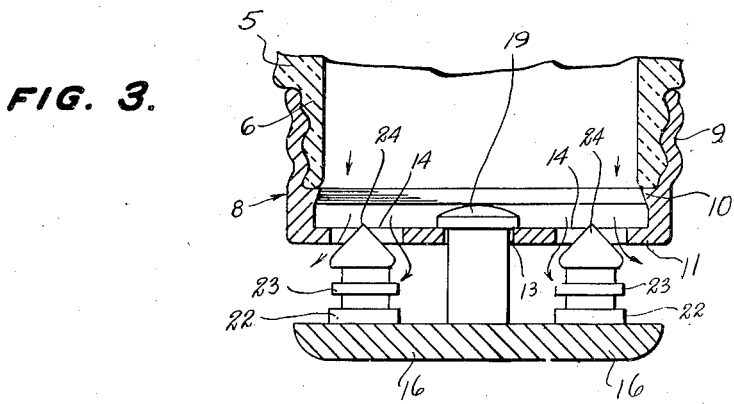
Figure 3 is a similar section in open or dispensing position.

Figure 2 shows the lid positioned adjacent the cap and the dispensing holes in the latter closed by the plug portions. When the lid is moved away from the closure the scrapers 23 will wipe the condiment from the edges of the holes. When the device is up-ended to dispense salt or the like through the holes 14, with the lid 16 in dependent dispensing position, the conical ends 24 of the pins 20 are concentrically spaced from the sides of and within the holes 14, as shown in Figure 3, thereby defining annular passages of limited cross-section, between the conical ends 24 and the edges of the holes 14, through which the salt falls at a free but desirably controllable rate.

While it is believed that from the foregoing description the nature and advantages of the invention will be readily apparent, I desire to have it understood that what is herein shown and described is merely illustrative of the preferred embodiment of the invention to which I do not limit myself, and that such changes in the construction and arrangement of parts may be resorted to when desired as fall within the scope of the subjoined claims.

What is claimed is:

1. A dispensing holder for salt or the like, said holder comprising a container provided with an open upper end, a cap secured to close said open upper end, said cap being formed with at least one salt dispensing opening, a lid arranged to normally rest upon said cap in the erect position of said container, means supportably connecting said lid to said cap and permitting said lid to fall to a depending position below said cap when said container is up-ended, at least one pin on the underside of said lid arranged to concentrically enter said dispensing opening in the normal position of said lid while said container is in its erect position, said pin being of smaller diameter than said dispensing opening, an enlarged head on said pin of slightly smaller diameter than said opening, said head being arranged to scrape salt from the edges of said opening as said pin enters said opening as said container is erected and said lid falls to rest upon said cap, said pin being arranged to withdraw from said dispensing opening as said container is up-ended and said lid falls to its depending position in a manner to permit salt to fall through said dispensing opening, an enlarged plug portion on said pin next to said lid of approximately the diameter of said dispensing opening for closing said opening in the normal position of said lid, said plug portion being substantially axially spaced from said enlarged head, and an enlarged scraper annulus on said pin intermediate said plug portion and said head, said scraper annulus having a diameter approaching that of said dispensing opening and being arranged to scrape salt from the edges of said dispensing opening as said pin is entered in and withdrawn from said dispensing opening.

2. A dispensing holder for salt or the like, said holder comprising a container provided with an open upper end, a cap secured to close said open upper end, said cap being formed with at least one salt dispensing opening, a lid arranged to normally rest upon said cap in the erect position of said container, means supportably connecting said lid to said cap and permitting said lid to fall to a depending position below said cap when said container is up-ended, at least one pin on the underside of said lid arranged to concentrically enter said dispensing opening in the normal position of said lid while said container is in its erect position, said pin being of smaller diameter than said dispensing opening, an enlarged head on said pin of slightly smaller diameter than said opening, said head being arranged to scrape salt from the edges of said opening as said pin enters said opening as said container is erected and said lid falls to rest upon said cap, said pin being arranged to withdraw from said dispensing opening as said container is up-ended and said lid falls to its depending position in a manner to permit salt to fall through said dispensing opening, said enlarged head being conical with the point thereof directed to enter said dispensing opening foremost, an enlarged plug portion on said pin next to said lid of approximately the diameter of said dispensing opening for closing said opening in the normal position of said lid, said conical head being substantially axially spaced from said plug portion, and an enlarged scraper annulus on said pin intermediate said plug portion and said conical head, said scraper annulus having a diameter approaching that of said dispensing opening and being positioned to scrape salt from the edges of said dispensing opening as said pin is entered in and is withdrawn from said dispensing opening.

ART CALISE.

REFERENCES CITED

The following references are of record in the file of this patent:

UNITED STATES PATENTS

| Number | Name | Date |
|---|---|---|
| 836,748 | Gallisath | Nov. 27, 1906 |
| 900,583 | Phenice | Oct. 6, 1908 |
| 1,102,302 | Slade | July 7, 1914 |
| 1,213,634 | Havassy | Jan 23, 1917 |
| 1,227,331 | Slade | May 22, 1917 |
| 1,776,395 | Rundell | Sept. 23, 1930 |
| 1,861,980 | Rundell | June 7, 1932 |
| 2,017,036 | Brady | Oct. 15, 1935 |

FOREIGN PATENTS

| Number | Country | Date |
|---|---|---|
| 396,659 | Great Britain | Aug. 10, 1933 |